United States Patent [19]

Kania et al.

[11] Patent Number: 4,808,656
[45] Date of Patent: Feb. 28, 1989

[54] HIGH SOLIDS COATING COMPOSITIONS

[75] Inventors: Charles M. Kania, Tarentum; Samuel Porter, Jr., Natrona Heights, both of Pa.

[73] Assignee: PPG Industries, Inc., Pittsburgh, Pa.

[21] Appl. No.: 45,332

[22] Filed: May 4, 1987

[51] Int. Cl.$^4$ .............................................. C08L 61/00
[52] U.S. Cl. ..................................... 524/512; 524/558
[58] Field of Search ............................... 524/558, 512

[56] References Cited

U.S. PATENT DOCUMENTS

| | | | |
|---|---|---|---|
| 4,510,284 | 4/1985 | Gimpel et al. | 524/558 |
| 4,522,958 | 6/1985 | Das et al. | 524/558 |
| 4,526,910 | 7/1985 | Das et al. | 524/558 |
| 4,532,294 | 7/1985 | Bouboulis | 524/773 |
| 4,687,822 | 8/1987 | Eguchi et al. | 526/265 |

FOREIGN PATENT DOCUMENTS 53-118489 10/1978 Japan .

OTHER PUBLICATIONS

Technical Data publication from the Pennwalt Corporation entitled "Advantages/Benefits of t-Amyl Peroxyesters".
Technical Data publication from the Pennwalt Corporation entitled "Tertiary-Amyl Peroxides for Acrylic High Solids Coating Resins".
"Hemijska Industrija", 1972, No. 8, pp. 309–313.
Makromol., 1972, 155 (4).

Primary Examiner—Joseph L. Schofer
Assistant Examiner—J. M. Reddick
Attorney, Agent, or Firm—William J. Uhl

[57] ABSTRACT

A curable high solids coating composition containing a reactive acrylic polymer formed from polymerizing an alpha, beta-ethylenically unsaturated monomer containing a functional group such as a hydroxyl group and other non-functional alpha, beta-ethylenically unsaturated monomers is disclosed. The polymer is prepared by organic solution polymerization techniques in an organic solvent and in the presence of t-amylperoxy compound and a 2,4-diaryl-1-alkene. The coating compositions are particularly useful as coatings for automobiles where they can be deposited as non-yellowing clear coats.

15 Claims, No Drawings

HIGH SOLIDS COATING COMPOSITIONS

BACKGROUND OF THE INVENTION

1. Field of the Invention

The present invention relates to high solids coating compositions, and more particularly, to high solids coating compositions containing acrylic polymers.

2. Brief Description of the Prior Art

Acrylic polymers are well known in the art as resinous binders for coating compositions. The acrylic polymers provide for hardness, gloss and exterior durability in the resultant coating making them particularly desirable as finishes for automobiles. The polymers may be thermoplastic or thermosetting in nature. For thermosetting polymers, the alpha, beta-ethylenically unsaturated monomer component usually includes a functional monomer such as a hydroxyl-containing monomer and the resulting polymer is combined with a curing agent such as a polyisocyanate or aminoplast resin to form a curable or thermosetting composition.

The compositions can be formulated with high molecular weight acrylic polymers. However, such polymers require the presence of relatively high amounts of organic solvent to reduce the viscosity of the polymer sufficiently for coatings applications. The high percentage of organic solvent results in air pollution problems. To avoid these problems, there has been a trend in the coatings industry to develop so-called high solids coatings which contain relatively low amounts of organic solvent. The polymers in such high solids compositions are of relatively low molecular weight so that the polymer will have a low viscosity and will not need much organic solvent for coatings application.

Unfortunately, low molecular weight acrylic polymers do not provide coatings with physical and chemical properties as good as coatings prepared from higher molecular weight acrylic polymers. In commerical practice a compromise is usually made between the molecular weight of the acrylic polymer and the solids content of the coating composition. Also, many of the high solids acrylic polymer coating compositions have a yellow cast when applied as a clear coat as is often done in automotive coatings when a clear coat is applied over a colored or pigmented basecoat.

SUMMARY OF THE INVENTION

In accordance with the present invention, a high solids coating composition is provided. The coating composition comprises as the resinous binder a reactive acrylic polymer which is formed from reacting from 10 to 60 percent by weight of a polymerizable alpha, beta-ethylenically unsaturated monomer containing a functional group which participates in the curing of the composition. Also included in the monomer component is from about 40 to 90 percent by weight of a polymerizable alpha, beta-ethylenically unsaturated monomer component free of functional groups. The acrylic polymer is prepared in organic solvent by solution polymerization techniques in the presence of a t-amylperoxy compound and a 2,4-diaryl-1-alkene.

The acrylic polymer prepared in accordance with the present invention is of low molecular weight and narrow molecular weight distribution. The polymers have low viscosities enabling them to be formulated into high solids coating compositions, however, the compositions can be deposited and cured to give coatings with excellent physical and chemical properties. The compositions can be deposited and cured as clear coats with excellent clarity and no tendency to yellow.

DETAILED DESCRIPTION

The acrylic polymers used in the high solids coating compositions of the present invention are reactive acrylic polymers in that they contain a functional group which participates in the curing reaction. Examples of functional groups are active hydrogens, which are preferred, such as hydroxyl, which is most preferred, amino and carboxylic acid, as well as N-methylol including alkylated derivatives thereof, and epoxy. One way of introducing the functional group into the polymer is to use an alpha, beta-ethylenically unsaturated monomer or mixture of monomers which contain the functional group.

Examples of monomers containing hydroxyl groups include hydroxyalkyl esters of acrylic or methacrylic acid containing from 2 to 4 carbon atoms in the alkyl group such as hydroxyethyl acrylate, hydroxyethyl methacrylate, hydroxypropyl acrylate and hydroxylpropyl methacrylate. Also, hydroxyl group-containing monomers such as the reaction product of hydroxyethyl acrylate and epsilon-caprolactone can be used.

Examples of amine group-containing monomers are t-butylaminoethyl acrylate, t-butylaminoethyl methacrylate and aminoethyl acrylate.

Examples of carboxylic acid group-containing monomers are acrylic acid, methacrylic acid, crotonic acid and itaconic acid.

Examples of N-methylol group-containing monomers are N-methylol acrylamide and N-methylol methacrylamide. Also, equivalents of N-methylol group-containing monomers, i.e., alkylated derivatives of these monomers may be used such as N-alkoxymethyl acrylamide and N-alkoxymethyl methacrylamide in which the alkoxy group contains from 1 to 4 carbon atoms. Specific examples include N-butoxymethyl acrylamide and N-ethoxymethyl methacrylamide.

Examples of epoxy group-containing monomers include glycidyl acrylate and glycidyl methacrylate.

As mentioned above, the functional groups participate in the curing reaction. In the case of functional groups such as hydroxyl, amino, carboxylic acid and epoxy, an externally added curing agent such as a polyisocyanate, an aminoplast, a polyepoxide or a polyacid curing agent should be present. In the case of N-methylol groups or their alkylated derivatives, an external curing agent is not necessary since these groups are self-curing.

The amount of the functional monomer which is used is from about 10 to 60, preferably 25 to 50 percent by weight, based on total weight of alpha, beta-ethylenically unsaturated monomers, and is sufficient to form a cured coating.

Besides the alpha, beta-ethylenically unsaturated monomers containing a functional group, other copolymerizable monomers which do not contain functional groups are also used. Examples of these monomers include vinyl aromatic compounds such as styrene and vinyl toluene; alkyl esters of acrylic and methacrylic acid containing from 1 to 20 carbon atoms in the alkyl group such as ethyl methacrylate, ethyl acrylate, butyl acrylate, 2-ethylhexyl acrylate and lauryl methacrylate; acrylic monomers containing amido groups such as acrylamide and methacrylamide. Examples of other polymerizable alpha, beta-ethylenically unsaturated monomers are vinyl halides such as vinyl chloride and vinyl fluoride; vinyl nitriles such as acrylonitrile and methacrylonitrile; vinyl esters such as vinyl acetate and vinyl propionate.

The amount of alpha, beta-ethylenically unsaturated monomer free of functional groups is from 40 to 90, preferably 50 to 75 percent by weight, based on total weight of polymerizable alpha, beta-ethylenically unsaturated monomers.

The acrylic polymers of the present invention are prepared in organic solvent by solution polymerization techniques in which the reactive ingredients are heated in the presence of a t-amylperoxy compound and a 2,4-diaryl-1-alkene in the organic solvent in which the ingredients as well as the resultant polymer are soluble. Typically, the monomers, including the 2,4-diaryl-1-alkene, t-amylperoxy compound and chain transfer agent, are added slowly to a refluxing organic solvent. After addition is complete, additional t-amylperoxy compound may be added to complete the reaction.

The organic solvent is a high boiling solvent, preferably one which has a boiling point at atmospheric pressure of at least 150° C., preferably 160° to 185° C., and the reaction is preferably conducted under refluxing conditions. Examples of preferred solvents are esters of the structure:

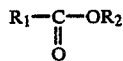

where $R_1$ is straight or branched chain alkyl of 1 to 6 carbon atoms and $R_2$ is straight or branched chain alkyl of 1 to 7 carbon atoms and $R_1$ plus $R_2$ contains at least 6 carbon atoms. Specific examples of suitable solvents of this type include hexyl acetate and heptyl acetate.

Examples of other solvents which can be used in the practice of the invention include ketones such as methyl amyl ketone and glycol ethers such as 2-butoxyethanol, propylene glycol monoethyl ether; alcohols such as benzyl alcohol; esters such as 2-butoxyethyl acetate, 1-ethyl-3-ethoxy-3-propionate and aromatics such as mixtures of aromatic compounds such as those available under the trademark Solvesso 100. The amount of organic solvent which is used will range from 10 to 50, preferably 20 to 40 percent by weight, based on total weight of monomers and organic solvent.

The free radical initiator which is used is a t-amylperoxy compound such as 1,1-di(t-amylperoxy)cyclohexane also t-amylperoxy esters such as t-amylperoxy acetate, and ethyl-3,3-di(t-amylperoxy)butyrate. The amount of free radical initiator that is used will vary in amounts from about 1 to 10, preferably 2 to 8 percent by weight, based on total weight of polymerizable alpha, beta-ethylenically unsaturated monomers.

In addition to the alpha, beta-ethylenically unsaturated monomers mentioned above, a 2,4-diaryl-1-alkene is also present during the polymerization. Although not intending to be bound by any theory, it is believed this compound acts as a chain transfer agent or chain terminator to regulate the molecular weight of the acrylic polymer. Examples of such materials are those of the structure:

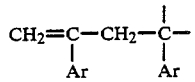

where Ar is an aryl group such as phenyl.

Examples of such chain transfer agents are 2,4-diphenyl-4-methyl-1-pentene. Also, materials such as the dimer of alpha-methyl-styrene can be used. Such a material is a mixture of 2,4-diphenyl-4-methyl-pentene-1; 2,4-diphenyl-4-methyl-pentene-2 (cis and trans) and 1,1,3-trimethyl-3-phenyl-endane. The amount of chain transfer agent will vary from 1 to 20, preferably 5 to 15 percent by weight based on total weight of alpha, beta-ethylenically unsaturated monomers. Amounts less than 1 percent by weight are undesirable because the resulting polymer will have an undesirably high molecular weight; whereas amounts greater than 20 percent by weight result in broadening of the molecular weight distribution.

Preferably, the acrylic polymers prepared in accordance with the invention will have weight average molecular weights of less than 6000, more preferably about 2000 to 5000, and molecular weight distributions ($M_w/M_n$) of less than 2.5, usually about 1.9 to 2.5. The molecular weight is determined by gel permeation chromatography using a polystyrene standard. Thus, the numbers obtained are really polystyrene numbers; however, for the purposes of this invention, they are considered to be molecular weights.

In measuring the weight average molecular weight using polystyrene as the standard, a Waters Associates Gel Permeation Chromatograph Model 201 was used. Four $\mu$-Styragel columns were used. Each column has the dimensions of 30 centimeters long and 7.8 millimeters inside diameter. A differential refractometer was used as the detector, and the columns were arranged according to their pore size on the order of $10^4$-$10^3$-500-100 Angstroms with the $10^4$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm. were used.

To determine molecular weight by gel permeation chromatography (GPC), the instrument is first calibrated using a polystyrene standard. The polystyrene standards used were purchased from Pressure Chemicals Company, Pittsburgh, Pa., and Waters Associates. Polystyrene standards have dispersities (dispersity=weight average molecular weight/number average molecular weight) ranging from 1.05 to 1.10. The weight average molecular weight of the polystyrene standards used were 110,000; 34,500; 20,000; 9,000; 4,000; 2,900; 1,000. To obtain a calibration curve, a set of 1.0 percent (10 milligram polystyrene/1.0 ml. tetrahydrofuran) polystyrene solutions in tetrahydrofuran were prepared and a 0.2 ml. sample size was injected into the columns and a GPC chromatogram was obtained. The elution volume of each peak corresponding to a given molecular weight of the polystyrene standard was measured and the data was plotted on a semi-logarithmic paper (logarithm scale in the ordinate and a linear scale in the abscissa). A linear least squares plot of $\log_{10}$ (molecular weight) versus elution volume in milliliters is used as a calibration curve. The lowest molecular weight of the polystyrene standard used was 2900 and the calibration curve beyond that was extrapolated down to 100. The upper and lower exclusion limits of this set of columns are 450,000 and 100, respectively, in terms of the polystyrene molecular weight. The sample whose molecular weight averages are to be determined was prepared as a 1.0 percent tetrahydrofuran solution. After filtration to remove gel particles (if present), through a 0.5 micron Millipore filter available from Millipore Corporation, Catalog No. FHLP01300, a 0.2 ml. sample size was injected into the columns and a GPC chromatogram obtained under the same experimental conditions as the calibration. The chromatogram is divided into vertical segments of equal elution volume approximately 1 milliliter and the height ($H_i$) of each segment and the corresponding molecular weight ($M_i$) obtained from the calibration curve are used to calculate the weight average molecular weight ($M_w$) according to the following equation:

$$M_w = (\Sigma H_i M_i)/(\Sigma H_i)$$

Molecular weights of this order are desirable so as to produce coating compositions having a high solids content at coating application viscosities. In accordance with the invention, the coating compositions of the present invention preferably comprise at least 60 percent by weight and usually 60 to 80 percent by weight resin solids measured at 110° C. for 1 hour.

As mentioned above, when the acrylic polymer contains a functional group which is not self-reactive, a curing agent must be used with the acrylic polymer. In the case where the functional group is active hydrogen, particularly OH, the curing agent can be an aminoplast or polyisocyanate with the aminoplast being preferred. The aminoplasts are aldehyde condensation products of amines or amides with aldehydes. Examples of suitable amines or amides are melamine, benzoguanamine, urea or similar compounds. Generally, the aldehyde employed is formaldehyde, although products can be made from other aldehydes such as acetaldehyde and furfural. The condensation products contain methylol groups or similar alkylol groups depending upon the particular aldehyde employed. If desired, these methylol groups can be etherified by reaction with an alcohol. Various alcohols are employed and generally include any monohydric alcohol, although the preferred alcohol contains from 1 to 4 carbon atoms such as methanol, ethanol, isopropanol and n-butanol. Aminoplasts are commercially available from American Cyanamid Company under the trademark Cymel and from the Monsanto Chemical Company under the trademark Resimine.

When the functional group is amine, the curing agent can be polyisocyanate or polyepoxide; when the functional group is carboxylic acid, the curing agent can be polyepoxide; when the functional group is epoxy, the curing agent can be polyacid or polyamine.

The acrylic polymers optionally with curing agent (resinous component) can be formulated into high solids coating compositions by techniques well known in the art. The resinous component can be combined with conventional ingredients present in coating compositions such as plasticizers, curing catalyst, anti-oxidants, UV absorbers and stabilizers, flow control agents, and, if desired, pigment, typically in the form of a pigment paste. The ingredients are usually mixed together with low shear mixing and then with solvent if necessary to get the proper viscosity for coating application, that is, a No. 4 Ford cup viscosity of 15 to 28 seconds.

The coatings of the present invention can be applied to substrates such as automobiles and the like using conventional methods of application such as spray coating including electrostatic spray coating. Other methods of application such as roller coating, dipping or brushing may also be used. Preferably, the coatings of the present invention are applied as high solids clear coatings over colored or pigmented basecoats.

After application, the coating compositions are usually cured at a temperature of from about 75° to 150° C., preferably from about 80° to 125° C. for about 15 to 45 minutes. The curing temperature will depend upon the particular curing mechanism used.

The process and compositions of the invention can be further illustrated by reference to the following examples wherein parts are parts by weight unless otherwise indicated.

EXAMPLES

The following examples show the preparation of curable high solids coating compositions containing various reactive acrylic polymers prepared by solution polymerization techniques. One of the polymers was prepared at a temperature of at least 150° C. in the presence of a t-amylperoxy compound and a 2,4-diaryl-1-alkene derivative. The other polymers were prepared at lower temperatures of polymerization or in the presence of the free radical initiators ditertiary-butyl peroxide or 2,2'-azobis(2-methylbutyronitrile) or the chain transfer agent mercaptoethanol.

The coating compositions prepared from these acrylic polymers were evaluated for solids content, volatile organic content (VOC), viscosity and color. Also, the molecular weight of the reactive acrylic polymers was determined. The formulated coating compositions were applied as clear coatings to metal substrates and cured and the properties of the coatings such as hardness, yellowing and solvent resistance were determined.

The following examples (A–E) show the preparation of various reactive acrylic polymers.

Example A

A reactive acrylic polymer in accordance with the present invention was prepared from the following mixture of ingredients:

| Ingredients | Parts by Weight (grams) |
| --- | --- |
| Reactor Charge | |
| Hexyl acetate[1] | 480 |
| Feed A | |
| Hydroxypropyl acrylate | 864 |
| Styrene | 423 |
| Butyl acrylate | 408 |
| Butyl methacrylate | 408 |
| Dimer of alpha-methylstyrene | 240 |
| Acrylic acid | 48 |
| Feed B | |
| Hexyl acetate | 320 |
| t-amylperoxy acetate[2] | 240 (144 solids) |
| Feeds C, D and E (each) | |
| t-amylperoxy acetate | 8 (4.8 solids) |

[1]EXXATE 600 from Exxon.
[2]LUPERSOL 555 from Pennwalt Corparation.

The reactor charge was heated under a nitrogen atmosphere to reflux at 167° C. followed by the initiation of Feeds A and B over a 2-hour period while keeping the reaction temperature at reflux. At the completion of Feeds A and B, Feeds C, D and E were added sequentially. After each addition, the reaction mixture was held at reflux for one hour. The reaction mixture was then cooled to room temperature. The molecular weight, viscosity, color and solids content of the resulting polymeric reaction mixture are reported in Table I below.

Example B

An acrylic polymer similar to that of Example A was prepared with the exception that di-t-butyl peroxide replaced the Lupersol 555.

| Ingredients | Parts by Weight (grams) |
|---|---|
| Reactor Charge | |
| Hexyl acetate | 480 |
| Feed A | |
| Hydroxypropyl acrylate | 864 |
| Styrene | 423 |
| Butyl acrylate | 408 |
| Butyl methacrylate | 408 |
| Dimer of alpha-methylstyrene | 240 |
| Acrylic acid | 48 |
| Feed B | |
| Hexyl acetate | 425.6 |
| Ditertiarybutyl peroxide | 144 |
| Feeds C, D and E (each) | |
| Di-t-butyl peroxide | 4.8 |

The reactor charge was heated under a nitrogen atmosphere to reflux at 166° C. followed by the additions of Feeds A and B over a 2-hour period while maintaining the reaction mixture at reflux. At the completion of Feeds A and B, Feeds C, D and E were added sequentially. After each addition, the reaction mixture was held for one hour at reflux. The reaction mixture was then cooled to room temperature. The molecular weight, viscosity, color and solids content of the polymeric reaction mixture are reported in Table I below.

Example C

A reactive acrylic polymer similar to that of Example A was prepared with the exception that Vazo-67, 2,2'-azobis(2-methylbutyronitrile), free radical initiator was used in place of the Lupersol 555. The polymer was prepared from the following ingredients:

| Ingredients | Parts by Weight (grams) |
|---|---|
| Reactor Charge | |
| Hexyl acetate | 480 |
| Feed A | |
| Hydroxypropyl acrylate | 864 |
| Styrene | 423 |
| Butyl acrylate | 408 |
| Butyl methacrylate | 408 |
| Acrylic acid | 48 |
| Dimer of alpha-methylstyrene | 240 |
| Feed B | |
| Hexyl acetate | 425.6 |
| VAZO-67[1] | 144 |
| Feeds C, D and E (each) | |
| VAZO-67 | 4.8 |

[1] 2,2'-azobis(2-methylbutyronitrile) from E. I. duPont de Nemours & Company.

The reactor charge was heated under a nitrogen atmosphere to reflux at 164° C. followed by the additions of Feeds A and B over a 2-hour period while maintaining the reaction mixture at reflux. When Feeds A and B were complete, Feeds C, D and E were added sequentially. After each addition, the reaction mixture was held at reflux for one hour. The reaction mixture was then cooled to room temperature. The molecular weight, viscosity, color and solids content of the polymeric reaction mixture are reported in Table I below.

Example D

A reactive acrylic polymer similar to that of Example A was prepared but with mercaptoethanol, a chain transfer agent, used in place of the dimer of alpha-methylstyrene.

| Ingredients | Parts by Weight (grams) |
|---|---|
| Reactor Charge | |
| Hecyl acetate | 480 |
| Feed A | |
| Hydroxypropyl acrylate | 864 |
| Styrene | 480 |
| Butyl acrylate | 444 |
| Butyl methacrylate | 444 |
| Mercaptoethanol | 120 |
| Acrylic acid | 48 |
| Feed B | |
| Hexyl acetate | 320 |
| LUPERSOL 555 | 240 (144 solids) |
| Feeds C, D and E (each) | |
| LUPERSOL 555 | (4.8 solids) |

The reactor charge was heated under a nitrogen atmosphere to reflux at 164° C. followed by the additions of Feeds A and B over a 2-hour period while holding the reaction temperature at reflux. At the completion of Feeds A and B, Feeds C, D and E were added sequentially. After each addition, the reaction mixture was held at reflux for one hour. The reaction mixture was then cooled to room temperature. The molecular weight, viscosity, color and solids content of the polymeric reaction mixture are reported in Table I below.

Example E

A reactive acrylic polymer similar to that of Example A was prepared with the exception that the temperature of reaction was below 150° C. The polymer was prepared from the following ingredients:

| Ingredients | Parts by Weight (grams) |
|---|---|
| Reactor Charge | |
| Hexyl acetate | 480 |
| Feed A | |
| Hydroxypropyl acrylate | 864 |
| Styrene | 423 |
| Butyl acrylate | 408 |
| Butyl methacrylate | 408 |
| Dimer of alpha-methylstyrene | 240 |
| Acrylic acid | 48 |
| Feed B | |
| Hexyl acetate | 320 |
| LUPERSOL 555 | 240 (144 solids) |
| Feeds C, D and E (each) | |
| LUPERSOL 555 | 8 (4.8 solids) |

The reactor charge was heated to 135° C. followed by the additions of Feeds A and B over a 2-hour period while maintaining the reaction temperature at about 137° C. At the completion of Feeds A and B, Feeds C, D and E were added sequentially. After each addition, the reaction mixture was held for one hour at 133° C. The reaction mixture was then cooled to room temperature. The molecular weight, viscosity, color and solids content of the polymeric reaction product are reported in Table I below.

TABLE I

Molecular Weight, Viscosity, Color and Solids Content of the Polymers of Examples A-E

| Example | Molecular Weight | | | Viscosity in Stokes | Nesslor Color[1] | Solids Content[2] |
|---|---|---|---|---|---|---|
| | Mw | Mn | Md | | | |
| A | 4213 | 1828 | 2.30 | 25.5 | 50 | 72.5 |
| B | 8442 | 2657 | 3.19 | 91 | 50 | 69.1 |
| C | 4191 | 1429 | 2.93 | 36.5 | 200 | 72.75 |
| D | 3112 | 1227 | 2.54 | 16.5 | 300 | 68.03 |
| E | 4309 | 1800 | 2.3 | 34.5 | 50 | 63.8 |

[1]ANSI/ASTM D-1209-69; the higher the value the greater the color.
[2]Determined by heating at 110° C. for 1 hour.

From Table I above, it is seen that replacing the tertiary-amylperoxy acetate with the ditertiarybutyl peroxide (Example B) results in a product with a higher molecular weight, broader molecular weight distribution, higher viscosity and lower solids content. Replacing with Vazo-67 (Example C) results in a product which has a somewhat broader molecular weight distribution, higher viscosity and greater color. Replacing the alpha-methylstyrene dimer with mercaptoethanol (Example D) results in a product with very intense color. Finally, conducting the reaction at lower temperature (Example E) results in a product with a somewhat higher viscosity and lower solids content.

The following examples (1-5) show the preparation of high solids clear coating compositions prepared with the polymers of Examples A-E above. In each instance, the coating was prepared from 66.6 grams of the particular polymer (50 grams total solids), 50 grams of the aminoplast curing agent Cymel 1130 (methylolated melamine-formaldehyde condensate from American Cyanamid Co.), 2.5 grams of a catalyst solution which is a 37.5 percent by weight dinonyl disulfonic acid 50 percent neutralized with diisopropylamine in isopropanol. The theoretical solids content was adjusted to 70 percent by weight with hexyl acetate. The experimental solids content, VOC and viscosity of the coating compositions are reported in Table II below.

TABLE II

Solids, VOC and Viscosity of Formulated Coating Compositions Using Reactive Polymers of Examples A-E

| Example | Polymer of Example | Solids Content | VOC[1] | Viscosity (in Stokes) |
|---|---|---|---|---|
| 1 | A | 63.4 | 3.137 | 3.0 |
| 2 | B | 62.9 | 3.175 | 6.1 |
| 3 | C | 63.0 | 3.178 | 4.6 |
| 4 | D | 62.3 | 3.250 | 3.1 |
| 5 | E | 62.4 | 3.211 | 4.0 |

[1]VOC = 1 − % solids × weight in pounds per gallon.

The data in Table II shows that the coating compositions of the present invention prepared with the reactive acrylic polymer of Example A result in a composition with highest solids content, lowest VOC's and lowest viscosities.

The high solids coating compositions described above were drawn down over glass panels and cured by heating at 250° F. (121° C.) for 30 minutes to form a cured film. The cured coatings were then evaluated for hardness, tendency of the film to yellow and acetone resistance. The resuls are reported in Table III below.

TABLE III

Hardness, Yellowness and Solvent Resistance of Cured Clear Coats Using Reactive Polymers of Examples A-E

| Example | Polymer of Example | Sward Hardness[1] | Tendency to Yellow | Acetone Resistance[2] (Double Rubs) | Percent Insoluble Fraction in Cured Film[3] |
|---|---|---|---|---|---|
| 1 | A | 40 | none | 100 | 95 |
| 2 | B | 52 | very little | 100 | 94 |
| 3 | C | 52 | yellows | 100 | 89.1 |
| 4 | D | 40 | yellows (worse than C) | 75 | 79.7 |
| 5 | E | 54 | none | 100 | 96 |

[1]Determined using a Sward Rocker as described in Organic Coatings Technology, Payne, Vol. 1, 1965, pages 642-643.
[2]Acetone resistance determined by taking an acetone saturated cloth and rubbing back and forth (double rub) across the cured coating using normal hand pressure until the coating softened. 100 double rubs was the upper limit of the test.
[3]The percentage insoluble fraction is determined by scraping the cured film off the glass substrate, weighing it and mixing it with a predetermined amount of toluene and determining a theortical solids content. The toluene mixture was then refluxed for 3 hours, cooled and the insoluble portion removed by centrifuging. A solids content was made on the remaining solution. This solids content divided by theoretical solids content of the original toluene mixture is the percent soluble fraction and this percentage subtracted from 100 percent is the percent insoluble fraction which is an indication of the crosslink density of the insoluble film.

The following examples (F and G) show the preparation of reactive acrylic polymers similar to Example A but prepared in the presence of 1,1-di(t-amylperoxy) cyclohexane or ethyl-3,3-di(t-amylperoxy) butyrate instead of t-amylperoxy acetate.

EXAMPLE F

The reactive acrylic polymer was prepared from the following ingredients:

| Ingredients | Parts by Weight (grams) |
|---|---|
| Reactor Charge | |
| Hexyl acetate | 576 |
| Feed A | |
| Hydroxypropyl acrylate | 806.4 |
| Styrene | 403.2 |
| Butyl acrylate | 380.8 |
| Butyl methacrylate | 396.6 |
| Dimer of alpha-methylstyrene | 224.0 |
| Acrylic acid | 44.8 |
| Methyl methacrylate | 11.2 |
| Feed B | |
| Hexyl acetate | 384.1 |
| LUPERSOL 531[1] | 168.0 (134.4 solids) |
| Feeds C, D and E (each) | |
| LUPERSOL 531 | 5.6 (4.48 solids) |

[1]1,1-di(t-amylperoxy) cyclohexane available from Pennwalt Corporation.

The reactor charge was heated under a nitrogen atmosphere to relfux at 163° C. followed by the additions of Feeds A and B over a 2-hour period while keeping the reaction mixture at reflux. At the completion of Feeds A and B, Feeds C, D and E were added sequentially. After each addition, the mixture was held at reflux for one hour. The reaction mixture was then cooled to room temperature. The resultant polymer had a weight average molecular weight of 5179, number average molecular weight of 1830, a molecular weight distribution of 2.80, a solids content of 70 percent and a Gardner-Holdt viscosity of X-Y. When formulated into a coating composition as described above for Examples 1-5, the composition had a solids content of 62.8, a VOC of 3.2 and a viscosity of 3.8 stokes. When the coating composition was drawn down over a glass substrate to form a clear coat and cured as described in Examples 1–5, the resultant cured coating had a Sward hardness of 46, no tendency to yellow and acetone resistance of 100 double rubs.

Example G

A reactive acrylic polymer was prepared from the following ingredients:

| Ingredients | Parts by Weight (grams) |
| --- | --- |
| Reactor Charge | |
| Hexyl acetate | 576.2 |
| Feed A | |
| Hydroxypropyl acrylate | 806.4 |
| Styrene | 403.6 |
| Butyl acrylate | 380.1 |
| Butyl methacrylate | 369.3 |
| Alpha-methylstyrene dimer | 224.0 |
| Acrylic acid | 44.8 |
| Methyl methacrylate | 11.2 |
| Feed B | |
| Hexyl acetate | 384.5 |
| LUPERSOL 533[1] | 179.2 (134.4 solids) |
| Feeds C, D and E (each) | |
| LUPERSOL 533 | 6.0 (4.5 solids) |

[1]Ethyl-3,3-di(t-amylperoxy) butyrate available from Pennwalt Corporation.

The reactor charge was heated under a nitrogen atmosphere to reflux at 164° C. followed by the additions of Feeds A and B over a 2-hour period while maintaining the reaction mixture at reflux. At the completion of Feeds A and B, Feeds C, D and E were added sequentially. After each addition, the reaction mixture was held for one hour at reflux. The reaction mixture was then cooled to room temperature. The polymer had a weight average molecular weight of 3981, a number average molecular weight of 1739, molecular weight distribution of 2.3, a solids content of 70 percent and a Gardner-Holdt viscosity of V+.

When the reactive polymer was formulated into a coating composition as described above in Examples 1–5, the resultant coating composition had a solids content of 62.5 percent, a VOC of 3.22 and a viscosity of 3.2 stokes. When the coating composition was drawn down over a glass substrate to form a clear coat and cured as described in Examples 1–5, the resultant cured coating had a Sward hardness of 40, no tendency to yellow and withstood 100 acetone double rubs.

The following examples (H and K) show the preparation of reactive acrylic polymers in the solvent heptyl acetate and ethyl-3-ethoxypropionate.

Example H

A reactive acrylic polymer was prepared from the following ingredients:

| Ingredients | Parts by Weight (grams) |
| --- | --- |
| Reactor Charge | |
| Heptyl acetate[1] | 576 |
| Feed A | |
| Hydroxypropyl acrylate | 806.4 |
| Styrene | 403.2 |
| Butyl acrylate | 380.8 |
| Butyl methacrylate | 369.6 |
| Dimer of alpha-methylstyrene | 224.0 |
| Acrylic acid | 44.8 |
| Methyl methacrylate | 11.2 |
| Feed B | |
| Heptyl acetate | 384.0 |
| LUPERSOL 555 | 224.0 (134.4 solids) |
| Feeds C, D and E (each) | |
| LUPERSOL 555 | 7.47 (4.48 solids) |

[1]EXXATE 700 available from Exxon.

The reactor charge was heated under a nitrogen atmosphere to reflux at 180° C. followed by the addition of Feeds A and B over a 2-hour period while maintaining the reaction mixture at reflux. Feeds C, D and E were added sequentially. The reaction mixture was held at reflux for one hour after each addition. The reaction mixture was then cooled to room temperature. The resultant polymer had a weight average molecular weight of 2976, number average molecular weight of 1279 and a molecular weight distribution of 2.33. The polymeric reaction mixture had a solids content of 70 percent and a Gardner-Holdt viscosity of W+. When formulated into a coating composition as described in Examples 1–5, the resultant coating had a solids content of 64.3, a VOC of 3.03 and a viscosity of 1.7 stokes. When drawn down over glass panels and cured as described in Examples 1–5, the resultant coating had a Sward hardness of 38, no tendency for yellowing and withstood 100 acetone double rubs.

Example K

A reactive acrylic polymer was prepared from the following mixture of ingredients:

| Ingredients | Parts by Weight (grams) |
| --- | --- |
| Reactor Charge | |
| Ethyl-3-ethoxypropionate[1] | 480.0 |
| Feed A | |
| Hydroxypropyl acrylate | 864.0 |
| Styrene | 432.0 |
| Butyl acrylate | 408.0 |
| Butyl methacrylate | 396.0 |
| Dimer of alpha-methylstyrene | 240.0 |
| Acrylic acid | 48.0 |
| Methyl methacrylate | 12.0 |
| Feed B | |
| EKTAPRO EEP | 320.0 |
| LUPERSOL 555 | 240.0 (144.0 solids) |
| Feeds C, D and E (each) | |
| LUPERSOL 555 | 8.0 (4.8 solids) |

[1]EKTAPRO EEP available from Eastman Chemicals.

The reactor charge was heated under a nitrogen atmosphere to reflux at 168° C. Feeds A and B were added over a 2-hour period while maintaining the reaction mixture at reflux. At the completion of Feeds A and B, Feeds C, D and E were added sequentially. After each addition, the reaction mixture was held at reflux for one hour. The reaction mixture was then cooled to room temperature. The resultant polymer had a weight average molecular weight of 3754, number average molecular weight of 1903, molecular weight distribution of 2.0, a solids content of 70 percent and a Gardner-Holdt viscosity of Z−. When formulated into a coating composition as described in Examples 1–5, the resultant coating composition had a solids content of 63.9, a VOC of 3.1 and a viscosity of 2.1 stokes. When the composition was drawn down over glass panels and cured as described in Example 1–5, the resultant cured coating had a Sward hardness of 44, no tendency for yellowing and withstood 100 acetone double rubs.

We claim:

1. A curable high solids coating composition containing at least 60 percent by weight resin solids and capable of being deposited as a non-yellowing clear coat comprising a reactive acrylic polymer formed from polymerizing:
   (A) from 10 to 60 percent by weight of a polymerizable alpha, beta-ethylenically unsaturated monomer containing a functional group which participates in the curing of the coating composition,
   (B) from 40 to 90 percent by weight of a polymerizable alpha, beta-ethylenically unsaturated monomer free of functional groups;
   said acrylic polymer being prepared in organic solvent by solution polymerization techniques in the presence of a t-amylperoxy compound and a 2,4-diaryl-1-alkene.

2. The composition of claim 1 in which the alpha, beta-ethylenically unsaturated monomer containing a functional group is a hydroxyl group-containing monomer.

3. The composition of claim 2 in which the hydroxyl group-containing monomer is selected from the class consisting of hydroxyethyl acrylate and methacrylate and hydroxypropyl acrylate and methacrylate.

4. The composition of claim 1 in which the polymerizable alpha, beta-ethylenically unsaturated monomer (B) is selected from the class consisting of alkyl esters of acrylic and methacrylic acid containing from 1 to 20 carbon atoms in the alkyl group, vinyl aromatic compounds and mixtures thereof.

5. The composition of claim 1 in which the organic solvent has a boiling point of at least 150° C.

6. The composition of claim 5 in which the organic solvent comprises a liquid ester of the structure:

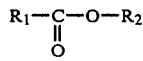

where $R_1$ is straight or branched chain alkyl of 1 to 6 carbon atoms and $R_2$ is straight or branched chain alkyl of 1 to 7 carbon atoms and $R_1$ plus $R_2$ contains at least 6 carbon atoms.

7. The composition of claim 6 in which the liquid ester is selected from the class consisting of hexyl acetate, heptyl acetate and mixtures thereof.

8. The composition of claim 1 in which the t-amylperoxy compound is a t-amylperoxy ester.

9. The composition of claim 8 in which the t-amylperoxy ester is selected from the class consisting of t-amylperoxy acetate, ethyl-3,3-di(t-amylperoxy)butyrate and mixtures thereof.

10. The composition of claim 1 in which the 2,4-diaryl-1-alkene is 2,4-diphenyl-4-methyl-1-pentene.

11. The composition of claim 1 in which the t-amylperoxy compound is present in amounts of 1.5 to 10 percent by weight based on total weight of alpha, beta-ethylenically unsaturated monomers.

12. The composition of claim 1 in which the 2,4-diaryl-1-alkene is present in amounts of 1 to 20 percent by weight based on total weight of alpha, beta-ethylenically unsaturated monomers.

13. The composition of claim 1 which contains a separate curing agent reactive with the functional groups in the acrylic polymer to form a cured product.

14. The composition of claim 2 which contains an aminoplast curing agent.

15. The composition of claim 14 in which the aminoplast curing agent is present in amounts of 25 to 50 percent by weight based on total weight of acrylic polymer and aminoplast.

* * * * *